(12) United States Patent
Krauss

(10) Patent No.: US 7,519,805 B2
(45) Date of Patent: Apr. 14, 2009

(54) METHOD FOR OPERATING A DATA PROCESSING DEVICE WHILE USING COMPRESSED DATA

(75) Inventor: Peter Krauss, München (DE)

(73) Assignee: EADS Astrium GmbH, Munich (DE)

(*) Notice: Subject to any disclaimer, the term of this patent is extended or adjusted under 35 U.S.C. 154(b) by 920 days.

(21) Appl. No.: 10/635,613

(22) Filed: Aug. 7, 2003

(65) Prior Publication Data
US 2004/0030824 A1 Feb. 12, 2004

(30) Foreign Application Priority Data
Aug. 8, 2002 (DE) .................. 102 36 571

(51) Int. Cl.
*G06F 15/177* (2006.01)
(52) U.S. Cl. .................. 713/2; 713/1; 713/100
(58) Field of Classification Search .......... 713/1, 713/2, 100
See application file for complete search history.

(56) References Cited

U.S. PATENT DOCUMENTS

| | | | | |
|---|---|---|---|---|
| 4,821,294 | A * | 4/1989 | Thomas, Jr. .................. 375/343 |
| 5,130,809 | A * | 7/1992 | Takayanagi .................. 358/300 |
| 5,170,263 | A * | 12/1992 | Hisatake et al. ............. 358/3.29 |
| 5,175,632 | A * | 12/1992 | Hayashi et al. ............. 358/401 |
| 5,245,446 | A * | 9/1993 | Takayanagi .................. 358/468 |
| 5,463,476 | A * | 10/1995 | Oya ....................... 358/426.02 |
| 5,530,847 | A * | 6/1996 | Schieve et al. ................. 714/38 |
| 5,600,766 | A | 2/1997 | Deckys et al. |
| 5,701,492 | A * | 12/1997 | Wadsworth et al. .......... 717/173 |
| 5,836,013 | A * | 11/1998 | Greene et al. .................. 713/2 |
| 5,901,310 | A | 5/1999 | Rahman et al. |
| 6,023,761 | A | 2/2000 | Ott |
| 6,122,379 | A * | 9/2000 | Barbir ........................ 380/269 |
| 6,212,632 | B1 | 4/2001 | Surine et al. |
| 6,560,756 | B1 * | 5/2003 | Necoechea et al. ............. 716/4 |
| 6,667,811 | B1 * | 12/2003 | Katahira ..................... 358/1.14 |
| 6,912,305 | B1 * | 6/2005 | Finlayson et al. ........... 382/162 |
| 2001/0031944 | A1 * | 10/2001 | Peterson et al. ................ 604/65 |
| 2002/0105955 | A1 * | 8/2002 | Roberts et al. .............. 370/401 |
| 2002/0126311 | A1 * | 9/2002 | Tanaka ....................... 358/1.15 |
| 2002/0138592 | A1 * | 9/2002 | Toft ............................ 709/219 |

(Continued)

FOREIGN PATENT DOCUMENTS
WO  WO 94/19768 A1  9/1994

(Continued)

OTHER PUBLICATIONS

R. Minnich et al., "The Linux BIOS", Proceedings of the 4th Annual Linux Showcase & Conference, Altanta, GA, USA, Oct. 10-14, 2000, pp. 1-7.

(Continued)

*Primary Examiner*—Thomas Lee
*Assistant Examiner*—Jaweed A Abbaszadeh
(74) *Attorney, Agent, or Firm*—Crowell & Moring LLP

(57) ABSTRACT

The invention describes a method for operating a data processing device while using compressed data, wherein a non-compressed boot program is loaded into a volatile working memory, which initiates a copying process of a compressed application program from a data memory into a volatile working memory with simultaneous decompression of the application program.

12 Claims, 1 Drawing Sheet

U.S. PATENT DOCUMENTS

2003/0046359 A1* 3/2003 Betz et al. .................. 709/216
2003/0063896 A1* 4/2003 Gonzalez Tovar et al. ..... 386/94
2003/0233558 A1* 12/2003 Lieberman et al. .......... 713/189

FOREIGN PATENT DOCUMENTS

WO  WO-00/41178 A1  7/2003

OTHER PUBLICATIONS

R. Minnich, "LOBOS: (Linux OS Boots OS) Booting a kernel in 32-bit mode", Proceedings of the 4th Annual Linux Showcase & Conference, Altanta, GA, USA, Oct. 10-14, 2000, pp. 1-9.

* cited by examiner

METHOD FOR OPERATING A DATA PROCESSING DEVICE WHILE USING COMPRESSED DATA

CROSS-REFERENCE TO RELATED APPLICATIONS

This application claims priority to German Patent Application No. 102 36 571.7, filed on Aug. 8, 2002.

FIELD OF THE INVENTION

The present invention relates to a method for operating a data processing device while using compressed data.

BACKGROUND OF THE INVENTION

Such methods are known for example from U.S. Pat. Nos. 5,600,766 and 6,023,761.

U.S. Pat. No. 5,600,766 describes the compressed storage of a graphic image in PROM, initialization of a power-on self test, decompression of the graphic image, copying of the decompressed graphic into RAM, and display of the decompressed graphic during the self-test.

U.S. Pat. No. 6,023,761 describes a decompression algorithm, which together with a main program is stored in a non-volatile memory. The decompression algorithm decompresses pre-allocated data of the main program and copies it into the volatile memory. The main program, which exists in uncompressed form, remains in the non-volatile memory.

SUMMARY OF THE INVENTION

It is an object of the present invention to provide an alternative method for operating a data processing device while using compressed data.

This object is attained with the features described herein. The description includes a special application of the invented method, a computer program, and a computer program product.

The invention comprises a method for operating a data processing device while using compressed data. A data processing device should be understood as any device that processes data, no matter what form or type. Data in the sense of the invention includes all types of data, such as so-called program codes, auxiliary data for executing a program code, or processing data, which are processed with the help of a program code. Pursuant to the present invention, the invented method comprises the following steps:

loading a non-compressed boot program from a first data memory into a volatile working memory, executing the boot program, copying, initiated by the boot program, of a compressed application program from a second data memory into a volatile working memory with simultaneous decompression of the application program, and starting the application program through the boot program.

The working memory may have different structures. It may either be designed as a uniform memory or be formed by two or more functionally and/or structurally separate memories, of which at least one is designed to be the program memory for storing data in the form of a program code and possibly some data that is required for executing the program code, and at least one are designed as a data memory for storing other data, except for program codes, i.e., for storing processing data, auxiliary data, etc.

Loading the boot program can preferably be controlled by a start process control device, which from a structural and/or functional point of view is separate from a processor device of the data processing device. In this way the special start process control device may be optimized for controlling the loading of the boot program, and this task does not have to be assumed by a general processor device of the data processing device, which can thus be optimized for other data processing operations.

In particular it can be provided that a first non-volatile memory of the data processing device is used as the data memory of the boot program and a second non-volatile memory of the data processing device is used as the data memory of the application program. One of the non-volatile memories or even both non-volatile memories may also be designed as variable non-volatile memories. Variable non-volatile means that, e.g., when turning off the data processing device the data are maintained in this storage, but the data content of the memory may basically be modified. In this case generally both the data memory for the boot program and the data memory for the application program are designed as part of the data processing device.

Alternatively, however, it may also be provided that via an interface device of the data processing device the first data memory and/or the second data memory are accessed. For example it may be provided that a non-volatile memory of the data processing device is used as the data memory of the boot program and the application program is copied via an interface device of the data processing device from a second data memory. In this case generally the data memory for the boot program is designed as part of the data processing device; the data memory for the application program, however, is not designed as part of the data processing device, instead an external data memory is accessed via an interface device for the purpose of copying the application program. The reverse of this is basically also possible, wherein the data memory for the application program is designed as part of the data processing device; the data memory for the boot program however is not designed as part of the data processing device, but instead an external data memory is accessed via an interface device for the purpose of accessing the boot program.

A preferred further development of the invented method provides that within the framework of decompressing the application program, decompression information for defined segments of the application programs is read and parameters of the decompression step for each segment are adjusted on the basis of the appropriate decompression information. The segments can for example be embedded in data packages, which, e.g., contain a first data range with control and decompression information, a second data range with data of the application program, and a third data range with error detection information.

In particular an invented method, as it is described above, may be employed in a board computer device of a space vehicle. Such a vehicle can either be a launch rocket, a space shuttle, a satellite, or a space probe. Alternatively, however, it is also possible to employ the invented method in a satellite navigation receiver device. This can basically be designed as a fixed ground station on earth or as a mobile satellite navigation receiver device, which can either have a portable design or be installed in any random type of land, water, air, or space vehicle. In particular the invented method can thus be used in a satellite navigation receiver device that is operated on board a space vehicle. Space vehicles again are the above-described types of spacecraft.

The invention moreover comprises a computer program for processing data of a data processing device, wherein the computer program is designed as a machine-readable boot program. The computer program is furthermore designed to execute the following procedural steps:

copying a compressed application program from a data memory into a volatile working memory with simultaneous decompression of the application program and starting the application program with the boot program.

Finally the invention comprises a computer program product, containing a machine-readable program carrier, which stores a computer program in the form of electronically readable control signals. The control signals can be stored in any suitable form; the electronic reading process may then occur accordingly through electric, magnetic, electromagnetic, electro-optical, or other electronic methods. Examples of such program carriers are magnetic tapes, diskettes, hard drives, CD-ROM, or semiconductor components.

DETAILED DESCRIPTION OF THE INVENTION

The described method can be employed generally with any type of data processing device, especially in any computer system where application programs in the form of software are loaded into a working memory. The use of the described method makes it possible to reduce the size of the software that needs to be loaded, thus reducing space requirements for permanent storage and also the loading time of the application program. Such a data processing device is shown in a diagrammatic depiction in FIG. 1.

Figure 2:
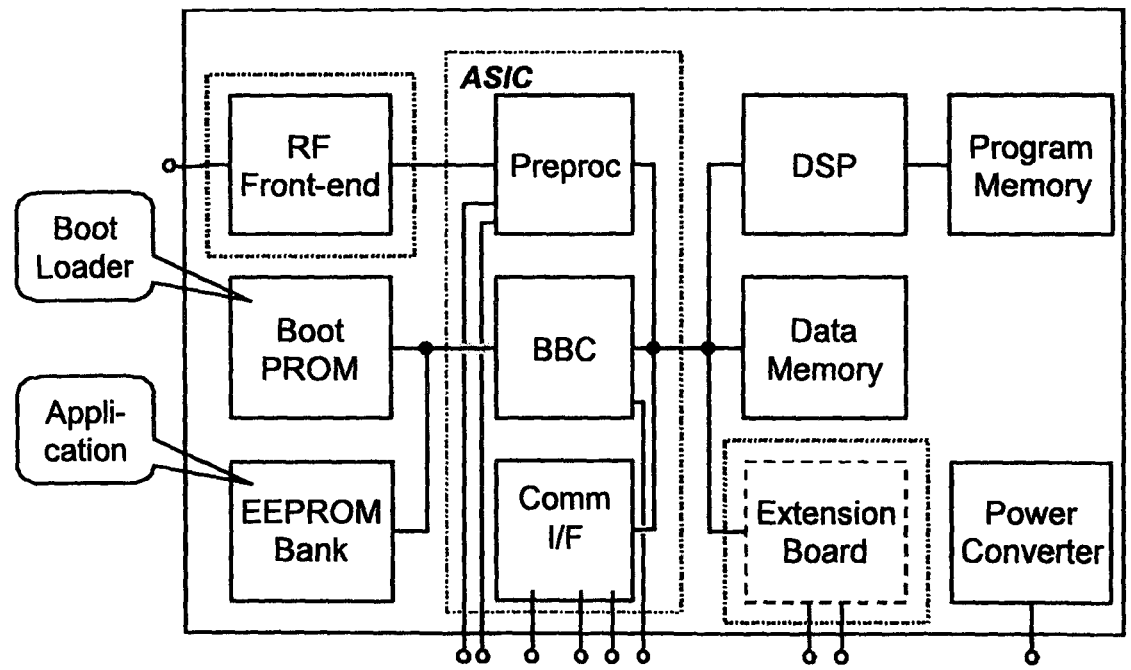
FIG. 2 illustrates a diagrammatic depiction of a satellite navigation receiver device

A special field of application for the described method is its use in an on-board computer device or in a satellite navigation receiver device (global navigation satellite system, GNSS), for example for GPS. FIG. 2 shows an example of a computer device of a satellite navigation receiver, as it can be used, for example, on board a space vehicle or in other satellite navigation devices. Said receiver/computer device serves to receive and evaluate satellite navigation signals.

Figure 1:
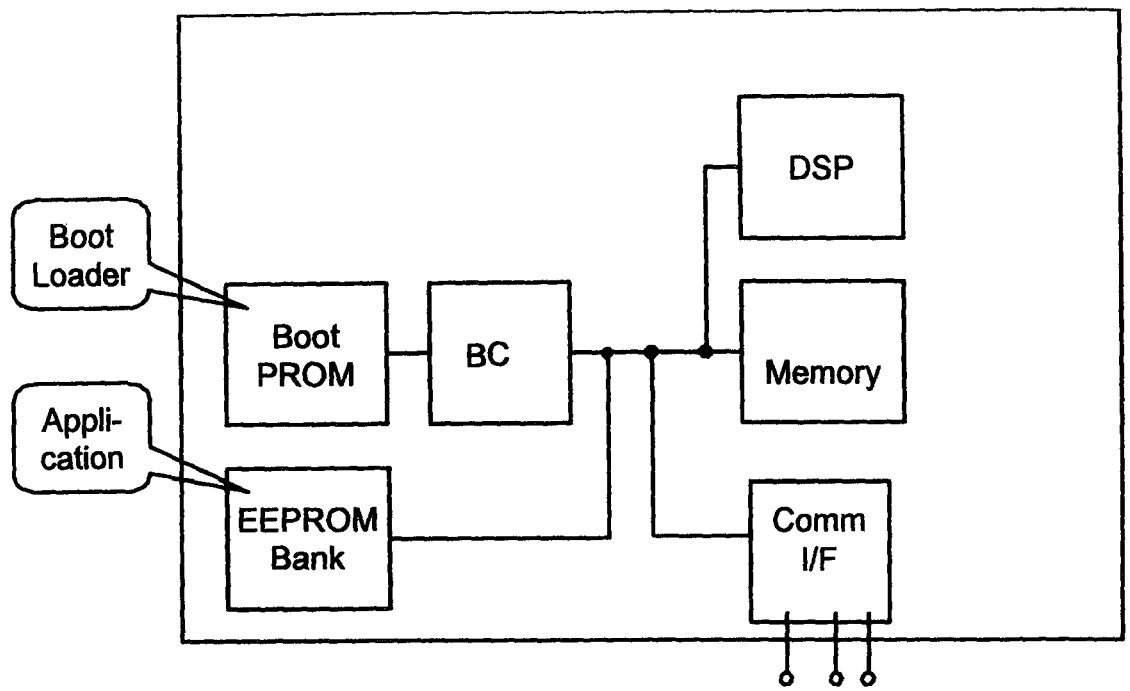
FIG. 1 illustrates a diagrammatic depiction of a data processing device

FIG. 1 shows a diagrammatic depiction of a special embodiment for the individual modules of a data processing device and their interaction. The following modules are designed in particular to implement the described method:

a) a CPU designed for digital data processing.
b) The memory is the working memory (RAM) for the CPU.
c) The PROM boot as non-volatile memory contains a boot program (boot loader).
d) The EEPROM bank as variable non-volatile memory contains an application program in compressed form.
e) Optionally, a control device (boot controller, BC) can be provided, which controls the start process (boot controller). The BC can be designed as part of an integrated circuit (e.g., ASIC or FPGA).
f) An interface device (Comm I/F) enables data exchange with other systems via various interfaces.

An application program is loaded into a working memory as needed. Examples for such a requirement are when turning a data processing device pursuant to FIG. 1 on or when resetting it. When turning a data processing device on or resetting it, in the present example the start of the data processing device, including the functionalities of the application program, takes place in three phases, in which preferably different components control the execution of the entire process.

In the first phase, the control is with the control device (boot controller), in the second phase with the boot program (boot loader), and in the third phase with the application program.

The first phase of control by the control device can take place as follows:

a) The CPU is kept in a special reset mode after being turned on or reset.
b) The boot controller copies the boot loader from the PROM boot into memory. The boot loader exists in the PROM boot in a non-compressed form and is therefore stored directly in the memory.
c) The CPU is released from the reset mode by the boot controller and executes the boot loader.

The type of implementation of the boot controller and its detailed mode of operation have no direct influence on the application of the method discussed here. The decisive factor is that the boot loader was loaded into the working memory of the CPU, and that the work in phase 2 begins from there.

The second phase of control by the boot program (boot loader) can take place as follows:

d) The boot loader copies the application program from the EEPROM bank into the memory. During this copying process, the application program is simultaneously decompressed. The direct, simultaneously conducted decompression process eliminates the need to keep additional memory available for the intermediate storage of the loaded, but still compressed application program.

As an alternative to loading the application program from the EEPROM bank, the boot loader can also load the application via one of the interfaces of the interface device (Comm I/F). This possibility of a second or alternative source for the application program can be used for example when the application program that is stored in the EEPROM bank is defective as such or the content of the EEPROM bank has been corrupted. The same decompression process also takes place if the application is loaded via the interface device (Comm I/F) instead of from the EEPROM bank. In particular a decompression process was selected that required only little computing time in order to be able to keep up with conventional speeds during the data transmission operation.

e) When the entire application program has been loaded and decompressed, the boot loader terminates its own operation by starting the application program.

Decompression therefore takes place exclusively in this phase 2. Thus the subsequent operations in the application program are of no importance for the decompression process.

The third phase of control by the application program then takes place as follows:

f) The application program commences with the actual work for which the computer system is intended.

FIG. 2 shows a diagrammatic depiction of another special embodiment for the individual modules of a satellite navigation receiver device and their interaction. The following modules are designed in particular for the implementation of the described method:

a) The DSP is a CPU that has been optimized especially for digital signal processing. One example of such digital signals is a navigation signal. The DSP however can also perform general computing operations.
b) The program memory and data memory are working memories (RAM) for the DSP. The program memory is designed as a program memory for storing data in the form of a program code and possibly some data that are required to execute the program code. The data memory is designed to store other data apart from program codes, i.e. for storing processing data, auxiliary data, etc.

c) The PROM boot contains a boot program (boot loader).

d) The EEPROM bank contains an application program in compressed form.

e) Optionally a control device (BBC) can be provided, which controls the start process (boot controller) and enables the DSP access to the PROM boot and the EEPROM bank (board controller). The BBC can be designed as part of an integrated circuit (e.g., ASIC or FPGA).

f) An interface device (Comm I/F) enables the data exchange with other systems via various interfaces.

An application program is loaded into a working memory as needed. Examples of such a requirement are when turning on a receiver pursuant to FIG. 2 or when resetting it. When turning a receiver on or resetting it, in the present example the start of the receiver including the functionalities of the application program takes place in three phases, in which preferably different components control the execution of the entire process. In the first phase, the control is with the control device (boot controller) as part of the BBC, in the second phase with the boot program (boot loader), and in the third phase with the application program.

The first phase of control by the control device may occur as follows, largely equivalent to the example from FIG. 1:

a) The DSP is kept in a special reset mode after being turned on or reset.

b) The boot controller copies the boot loader from the PROM boot into the program memory. The boot loader exists in the PROM boot in non-compressed form and is therefore stored directly in the program memory.

c) The DSP is released from the reset mode by the boot controller and executes the boot loader.

The type of implementation of the boot controller and its detailed mode of operation have no direct influence on the use of the method discussed here either. The decisive factor is that the boot loader has been loaded into the working memory of the DSP and the work in phase 2 begins from there.

The second phase of control by the boot program (boot loader) can take place as follows:

d) The boot loader copies the compressed application program from the EEPROM bank, wherein during this copying process the application program is simultaneously decompressed. After that at least the program code of the application program is stored in the program memory, and possibly additionally required data of the application program can be stored in the data memory. The direct, simultaneously performed decompression process eliminates the necessity of keeping additional memory available for the intermediate storage of the loaded, but still compressed application program.

As an alternative to loading the application program from the EEPROM bank, the boot loader can load the application via one of the interfaces of the interface device (Comm I/F) here as well. This possibility of a second or alternative source for the application program can be used for example when the application program that is stored in the EEPROM bank is defective as such, or the content of the EEPROM bank has been corrupted. The same decompression process also takes place if the application is loaded via the interface device (Comm I/F) instead of from the EEPROM bank. In particular a decompression process was selected that requires only little computing time in order to be able to keep up with conventional speeds during the data transmission operation.

e) When the entire application program has been loaded and decompressed, the boot loader terminates its own operation by starting the application program.

Decompression therefore again takes place exclusively in this phase 2. Thus the subsequent operations in the application program are of no importance for the decompression process.

The third phase of control by the application program then takes place as follows:

f) The application program commences the actual work, for which the satellite navigation receiver device is intended.

The algorithm for decompression should be as simple as possible in order to enable easy and consequently uncorrupted implementation. If the application is maintained in an EEPROM bank, errors in the application can be corrected at any time. The content of a PROM boot however can no longer be modified, which requires particular measures especially when using the described method in a space vehicle since after the start of the space vehicle the content of the PROM boot can no longer be influenced at justifiable cost.

Particularly in the special example of processing satellite navigation data, the analysis of the corresponding application programs showed that the use of compression methods can reduce the size considerably. A special compression method that supplies the best results is the LZSS method. The table depicted below lists a comparison of the compression factors that can be achieved using various compression methods. In this, the reference value is the uncompressed application program at 100%. The two methods Run Length Encoding and LZSS are generally known in the literature. After application of one of these methods, preferably an LZSS method, for compression purposes, decompression is then performed as a suitable reversal of the compression process.

TABLE

Achievable Compression Factors

| Method | Size [Byte] | Size [%] |
| --- | --- | --- |
| No compression | 288711 | 100% |
| Run Length Encoding | 111638 | 39% |
| LZSS with Standard Parameters | 68268 | 24% |
| LZSS with Optimized Parameters | 46165 | 16% |

Compressing an application program results in the following advantages: Through compression the size of the application program is reduced if it is to be stored or transmitted before execution. The resulting benefits are:

a) The EEPROM bank or a corresponding external memory can be reduced. Fewer memory components are required, accordingly fewer components must be installed and tested. This lowers the manufacturing cost of the computer system.

b) With a given size of the EEPROM bank or an external memory, its capacity can be used more effectively. For example in addition further applications can be stored. This increases the application possibilities of the computer system.

c) The access time for the EEPROM bank is considerably higher than for the working memory. The described method however reduces the overall time for loading the application program despite the required decompression process. In this way the start process is performed more quickly, the computer system can be used more quickly after being turned on.

d) If, alternatively, the application program is loaded from the exterior via a communication interface, the data transmission time and thus also the possibilities for error are reduced.

The use of further algorithms for example for calculating and verifying test sums for the detection and possibly correction of transmission or storage errors continues to be possible at any time, independent of the use of the compression operation.

The application of the described method is not limited to satellite navigation receivers or on-board computers. The method can also be employed in similar DSP- or CPU-based computer systems. With the simple adaptation to other CPU types, a useful application of the described method is also possible on other computer systems.

| Abbreviations: | |
|---|---|
| ASIC | Application Specific Integrated Circuit |
| BBC | Board &Boot Controller |
| CPU | Central Processing Unit |
| DSP | Digital Signal Processor |
| EEPROM | Erasable EPROM |
| EPROM | Electrical PROM |
| FPGA | Field Programmable Gate Array |
| GNSS | Global Navigation Satellite System |
| GPS | Global Positioning System |
| I/F | Interface |
| LZSS | Lempel Ziv Storer Szymanski |
| PROM | Programmable ROM |
| RAM | Random Access Memory |
| RF | Radio Frequency |
| RLE | Run Length Encoding |
| ROM | Read Only Memory |

The invention claimed is:

1. A method for operating a data processing device while using compressed data, comprising:
   loading a non-compressed boot program from a first data memory into a first volatile working memory;
   executing said boot program;
   copying, initiated by said boot program, of a compressed application program from a second data memory into a second volatile working memory with simultaneous decompression of said application program,
   starting said application program through said boot program; and
   wherein a first non-volatile memory of said data processing device is used as said data memory of said boot program, and a second non-volatile memory of said data processing device is used as said data memory of said application program.

2. The method of claim 1, wherein said loading of said boot program is controlled by a start process control device, which is separate from a processor device of said data processing device from a structural and/or functional point of view.

3. A method for operating a data processing device while using compressed data, comprising:
   loading a non-compressed boot program from a first data memory into a first volatile working memory;
   executing said boot program;
   copying, initiated by said boot program, of a compressed application program from a second data memory into a second volatile working memory with simultaneous decompression of said application program;
   starting said application program through said boot program; and
   wherein said first data memory and/or said second data memory is accessed via an interface device of said data processing device.

4. The method of claim 3, wherein a non-volatile memory of said data processing device is used as said first data memory of said boot program, and said application program is copied via said interface device of said data processing device from said second data memory.

5. A method for operating a data processing device while using compressed data, comprising:
   loading a non-compressed boot program from a first data memory into a first volatile working memory;
   executing said boot program;
   copying, initiated by said boot program, of a compressed application program from a second data memory into a second volatile working memory with simultaneous decompression of said application program;
   starting said application program through said boot program;
   wherein said first data memory and/or said second data memory is accessed via an interface device of said data processing device;
   wherein a non-volatile memory of said data processing device is used as said first data memory of said boot program, and said application program is copied via said interface device of said data processing device from said second data memory; and
   wherein, within a framework of decompression of said application program, decompression information for defined segments of said application program is read, and parameters of said decompression for each segment are adjusted based upon the appropriate decompression information.

6. A method for operating a data processing device while using compressed data, comprising:
   loading a non-compressed boot program from a first data memory into a first volatile working memory;
   executing said boot program;
   copying, initiated by said boot program, of a compressed application program from a second data memory into a second volatile working memory with simultaneous decompression of said application program;
   starting said application program through said boot program;
   wherein a first non-volatile memory of said data compressing device is used as said data memory of said boot program, and a second non-volatile memory of said data processing device is used as said data memory of said application program; and
   further comprising locating said data processing device on a space vehicle.

7. A method for operating a data processing device while using compressed data, comprising:
   loading a non-compressed boot program from a first data memory into a first volatile working memory;
   executing said boot program;
   copying, initiated by said boot program, of a compressed application program from a second data memory into a second volatile working memory with simultaneous decompression of said application program;
   starting said application program through said boot program;

wherein a first non-volatile memory of said data compressing device is used as said data memory of said boot program, and a second non-volatile memory of said data processing device is used as said data memory of said application program; and further comprising locating said data processing device in a satellite navigation receiver device.

8. A method for operating a data processing device while using compressed data, comprising:

loading a non-compressed boot program from a first data memory into a first volatile working memory;

executing said boot program;

copying, initiated by said boot program, of a compressed application program from a second data memory into a second volatile working memory with simultaneous decompression of said application program;

starting said application program through said boot program;

wherein a first non-volatile memory of said data compressing device is used as said data memory of said boot program, and a second non-volatile memory of said data processing device is used as said data memory of said application program; and further comprising locating said data processing device in a satellite navigation receiver device of a space vehicle.

9. An apparatus for data processing while using compressed data comprising:

a first data memory;

a first volatile working memory;

a second data memory; and a second volatile working memory; and a start process control device, wherein said start process control device controls loading of said boot program;

wherein said first data memory is used to store a non-compressed boot program and said first volatile working memory being used to hold a copy of said boot program;

wherein said second data memory is used to store an application program in compressed form and said second volatile working memory is used to store said application program in uncompressed form;

wherein said boot program is used to take said application program in compressed form from said second data memory, to convert said application program in compressed form to uncompressed form, and to copy said application program in uncompressed from to said second volatile memory; and wherein said boot program is used to run said application program.

10. The apparatus of claim 9, further comprising a processor device of said apparatus, wherein said start process control device is separate from said processor device of said apparatus.

11. The apparatus of claim 10 further comprising an interface device.

12. The apparatus of claim 11, wherein said interface device accesses said first data memory and/or said second data memory.

\* \* \* \* \*